(12) United States Patent
Gayheart

(10) Patent No.: US 8,715,600 B1
(45) Date of Patent: May 6, 2014

(54) CIRCULATING DRY SCRUBBER

(71) Applicant: Babcock & Wilcox Power Generation Group, Inc., Barberton, OH (US)

(72) Inventor: Jeb W Gayheart, Streetsboro, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 13/895,642

(22) Filed: May 16, 2013

(51) Int. Cl.
*B01D 53/50* (2006.01)
*B01D 53/81* (2006.01)
*B01D 53/83* (2006.01)

(52) U.S. Cl.
USPC ............ 423/210; 423/244.01; 423/244.07; 423/244.08; 423/215.5; 422/168; 422/177

(58) Field of Classification Search
USPC ............ 423/210, 244.01, 244.07, 244.08, 423/215.5; 422/168, 177
See application file for complete search history.

(56) References Cited

U.S. PATENT DOCUMENTS

| 4,548,797 A * | 10/1985 | Sauer et al. ............. 423/240 R |
| 4,726,940 A * | 2/1988 | Kobayashi ............. 423/246 |
| 5,092,929 A * | 3/1992 | Sauer et al. ............. 106/705 |
| 5,273,721 A * | 12/1993 | Hallstrom ............. 422/147 |
| 5,814,288 A * | 9/1998 | Madden et al. ............. 423/244.01 |
| 5,993,765 A * | 11/1999 | Beisswenger et al. ... 423/244.07 |
| 7,850,936 B2 * | 12/2010 | Levasseur et al. ........ 423/244.01 |
| 8,518,353 B1 * | 8/2013 | Neathery et al. ............. 423/210 |
| 2013/0294992 A1 * | 11/2013 | Fiedler ............. 423/244.07 |

FOREIGN PATENT DOCUMENTS

GB  2271560 A  *  4/1994  ............ 423/244.07

* cited by examiner

*Primary Examiner* — Timothy Vanoy
(74) *Attorney, Agent, or Firm* — Eric Marich

(57) ABSTRACT

A circulating dry scrubber flue gas desulfurization system is disclosed. Hydrated lime is injected into the flue gas upstream of the CDS vessel. The flue gas then passes through a baghouse, where solids are captured. At least a portion of the solids are recycled. The recycle path runs from the baghouse to a splitter, where the solids are divided between the injection points. No distribution box is needed, which permits lowering the height and/or restructuring the location of many components of the system, reducing costs as well as improving or maintaining removal of combustion byproducts from the flue gas.

20 Claims, 7 Drawing Sheets

SIDE VIEW

FIG. 2 SIDE VIEW

PLAN VIEW

PLAN VIEW

CIRCULATING DRY SCRUBBER

BACKGROUND

The present disclosure relates to a circulating dry scrubber (CDS) structure. This structure is used to remove particulates and other contaminants from flue gas produced during combustion, and is part of a dry scrubber flue gas desulfurization (FGD) system. In particular, sulfur dioxide ($SO_2$), sulfur trioxide ($SO_3$), HCl, and other acid gases can be captured. The structure permits the related components to be removed or to be placed at an elevation closer to grade. This, among other things, improves material usage and reduces capital costs and operating costs, and improves capture of particulates and/or other contaminants.

During combustion, the chemical energy in a fuel is converted to thermal heat, which can be used in various forms for different applications. The fuels used in the combustion process can include a wide range of solid, liquid, and gaseous substances, including coal, oil (diesel, No. 2, Bunker C or No. 6), natural gas, wood, tires, biomass, etc.

Combustion transforms the fuel into a large number of chemical compounds. Water ($H_2O$) and carbon dioxide ($CO_2$) are the primary products of complete combustion. However, other combustion reactions with chemical components in the fuel result in undesirable byproducts. Depending on the fuel used, such byproducts may include particulates (e.g. fly ash), acid gases such as sulfur oxides ($SO_X$) or nitric oxides ($NO_x$), metals such as mercury or arsenic, carbon monoxide (CO), and hydrocarbons (HC). The emissions levels of many of these byproducts are regulated by governmental entities, such as the U.S. Environmental Protection Agency (EPA).

Several different technologies exist for removing such byproducts from the flue gas. In one method, known as spray drying chemical absorption or dry scrubbing, an aqueous alkaline solution or slurry, which has been finely atomized, is sprayed into the hot flue gas downstream of the combustion chamber in which the fuel was combusted. The alkaline reagent reacts with the pollutants, and particulates are formed. The water evaporates and cools the hot flue gas. The exiting cleaned flue gas typically has a moisture content of about 10% to about 15%. The flue gas then travels to a particulate collection device, generally a baghouse, where the particulates are removed from the flue gas, which is then sent to a stack.

The layout of a circulating dry scrubber (CDS) flue gas desulfurization (FGD) system generally results in many different components being elevated a great distance above grade. The number of components and the structural steel needed to elevate the components add significant capital costs and operating costs to the overall system. It would be desirable to provide alternative CDS-FGD systems that can reduce such costs as well as improve or maintain combustion byproduct removal.

BRIEF DESCRIPTION

Disclosed herein are various methods and systems for reducing $SO_X$ emissions with a pollution control system that uses a dry scrubber for desulfurization. Briefly, a dry calcium hydroxide powder is injected into the flue gas upstream of the circulating dry scrubber (CDS). The resulting solids are then collected in a downstream baghouse. At least a portion of the solids are then recycled back to the dry scrubber. Rather than using a distribution box to evenly apportion the solids to the various injection points, a splitter is used instead. This structure removes the need for the use of a distribution box, and lowers the height of several components.

Disclosed in various embodiments is a flue gas desulfurization system, comprising: a hydrated lime injection point upstream of a circulating dry scrubber absorber vessel; a plurality of solids injection points located between the hydrated lime injection point and the circulating dry scrubber absorber vessel; a baghouse downstream of the circulating dry scrubber absorber vessel, the baghouse separating solid particles from clean gas; and a recycle system including a first air slide for the solid particles leading from the baghouse directly to a splitter, the splitter separating the solid particles to feed at least two second air slides, each second air slide feeding the solid particles directly to a solids injection point.

The system can further comprise a venturi downstream of each solids injection point, each venturi feeding into a bottom inlet of the circulating dry scrubber absorber vessel. The system can also further comprise a hydrated lime silo feeding the hydrated lime injection point. If desired, the system can further comprise a powdered activated carbon injection point between the hydrated lime injection point and the plurality of solids injection points.

The baghouse may be a pulse jet fabric filter, a shake deflate fabric filter, a reverse gas fabric filter, or an electrostatic precipitator.

The circulating dry scrubber absorber vessel can include a bottom inlet and a top outlet. The circulating dry scrubber absorber vessel may also include water injection points above the solids injection points. Generally, no distribution box is present in the recycle system between the baghouse and the solids injection points.

The system may further comprise a clean gas recirculation flue leading from downstream of the baghouse to a point upstream of the solids injection points. The hydrated lime generally has a residence time of about 2.5 seconds to about 8 seconds between the hydrated lime injection point and the baghouse.

Also disclosed herein are methods for recycling solid particles in a flue gas desulfurization system, comprising: separating solid particles from clean gas in a baghouse; sending at least a portion of the solid particles down a first air slide directly to a splitter, the splitter separating the solid particles to feed at least two second air slides, each second air slide feeding the solid particles directly to a solids injection point upstream of a circulating dry scrubber absorber vessel; reinjecting the solid particles into a flue gas flowpath at the solids injection points; and adding new hydrated lime into the flue gas flowpath at a hydrated lime injection point upstream of the solids injection points.

The methods may further comprise injecting powdered activated carbon at an injection point located between the hydrated lime injection point and the at least two solids injection points. The methods may further comprise recirculating at least a portion of the clean gas from downstream of the baghouse to a point upstream of the solids injection points.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
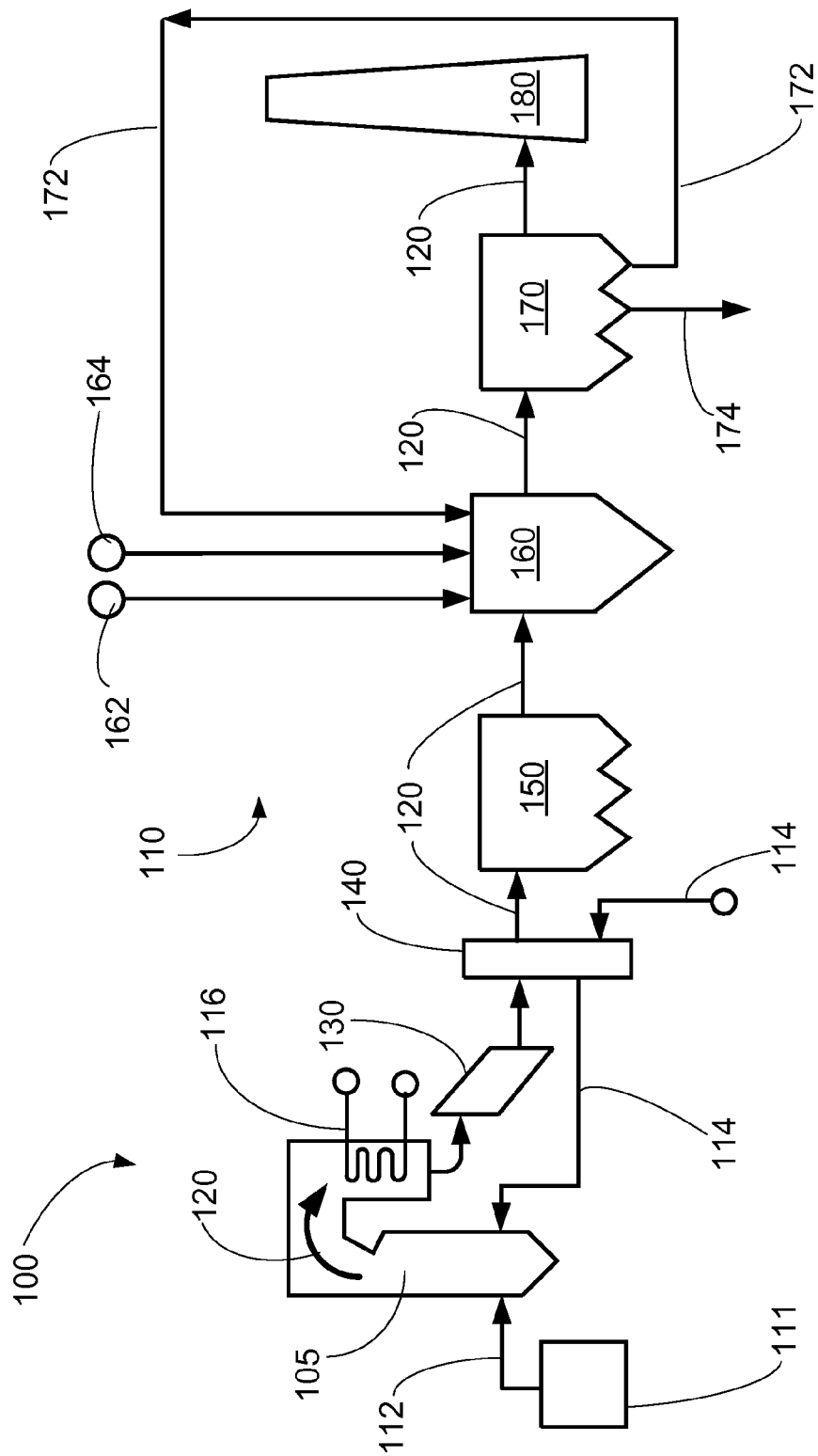
FIG. 1 is a diagram illustrating the components and flow paths of a conventional boiler with a dry desulfurization system.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the earth. The terms "upwards" and "downwards" are also relative to an absolute reference; an upwards flow is always against the gravity of the earth.

The term "hydrated lime" refers to calcium hydroxide, also known as $Ca(OH)_2$. The term "hydrated" when used here does not mean that molecular water is present. The term "lime slurry" is used to refer to a mixture of calcium hydroxide with water. Other calcium sorbents include, for example, limestone or quicklime. The term "limestone" refers to calcium carbonate, also known as $CaCO_3$. The term "quicklime" refers to calcium oxide, CaO.

The term "plane" is used herein to refer generally to a common level, and should be construed as referring to a volume, not as a flat surface.

The term "directly," when used to refer to two system components, means that no significant system components are in the path between the two named components. However, minor components, such as valves or pumps or other control devices, or sensors (e.g. temperature or pressure), may be located in the path between the two named components.

To the extent that explanations of certain terminology or principles of the boiler and/or steam generator arts may be necessary to understand the present disclosure, the reader is referred to *Steam/its generation and use,* 40th Edition, Stultz and Kitto, Eds., Copyright 1992, The Babcock & Wilcox Company, and to *Steam/its generation and use,* 41st Edition, Kitto and Stultz, Eds., Copyright 2005, The Babcock & Wilcox Company, the texts of which are hereby incorporated by reference as though fully set forth herein.

The present disclosure relates to various methods and systems for reducing $SO_X$ emissions using a circulating dry scrubber (CDS) for desulfurization. Very generally, a flue gas is generated by a combustion system containing a combustion chamber in which fuel is combusted. A dry calcium hydroxide powder (i.e. hydrated lime) is injected into the flue gas upstream of the CDS absorber vessel, earlier in the system to enhance contaminant removal. The resulting flue gas, now containing solid particles and clean gas, passes through a downstream baghouse to separate the solid particles from the clean gas. The solid particles are recycled back to the CDS absorber vessel using an air slide and a splitter. Unlike the conventional prior art system, no distribution box is present in this recycle path. To accommodate the distribution box in the prior art system, the baghouse and other components (e.g. the hydrated lime silo) were elevated above grade. The new system, by removing the need for a distribution box, permits the baghouse to be elevated a shorter distance above grade and permits the reconfiguration of the hydrated lime injection stream, reducing capital costs and operating costs, while improving or maintaining particulate/contaminant removal.

Generally, it is considered that the present desulfurization systems and methods can be used in combination with any combustion system. The combustion can be used for any purpose, for example to generate power, produce a certain product, or simply to incinerate a given fuel. Exemplary combustion systems in which the present methods may be applicable include power generation systems that use a boiler having a furnace as the combustion chamber; cement kilns; electric arc furnaces; glass furnaces; smelters (copper, gold, tin, etc.); pelletizer roasters; blast furnaces; coke oven batteries; chemical fired heaters; refinery ovens; and incinerators (medical waste, municipal solid waste, etc.). The term "combustion chamber" is used herein to refer to the specific structure within the system in which combustion occurs.

FIG. 1 generally illustrates an exemplary power generation system with a boiler 100 and a downstream desulfurization system 110. A fossil fuel 112, such as coal from a pulverizer 111, and air 114 are burned in the furnace 105, resulting in the generation of a flue gas 120. The flue gas 120 passes an economizer 116 used to preheat the water used in the boiler to produce steam and to cool the flue gas 120. Other heat transfer surfaces upstream of the economizer 116 are not shown. The flue gas 120 then enters a selective catalytic reduction (SCR) system 130, which may or may not be present, to remove nitrogen oxides ($NO_x$) from the flue gas 120. Next, the flue gas 120 passes through an air preheater 140 to further cool the flue gas 120 and heat the air 114 entering the furnace 105. After passing through the air preheater 140, the flue gas 120 typically has a temperature of about 250 to about 400° F. (121 to 204° C.). Sometimes the flue gas 120 then passes through a particulate collection device 150 to collect fly ash and other large particles. The flue gas continues into a dry scrubber 160. Here, hydrated lime 162 and water 164 are injected into the flue gas to react with sulfur oxides ($SO_x$) and to further cool the flue gas 120 to a range of about 140 to about 210° F. (60 to 99° C.). Separate injection of hydrated lime and water permits easy adjustment of the lime feed for variable $SO_x$ concentrations and permits the use of lower-quality water. In the absorber vessel 160, the water is evaporated, and the resulting cleaned and particle-laden flue gas 120 is conveyed to a baghouse 170, such as a fabric filter or an electrostatic precipitator, to remove the particles from the flue gas 120. The cleaned flue gas 120 is then sent to a stack 180.

A recycle stream 172 from the baghouse 170 is typically used to collect the solid alkaline particles and recycle them from the baghouse back to the dry scrubber 160. This recirculation gives unreacted reagent multiple opportunities to pass through the dry scrubber absorber vessel 160 and react with sulfur oxides, leading to high reagent utilization. Fresh hydrated lime 162 can be added as well to replace the used hydrated lime. Particles can also be removed from the baghouse 170 and disposed of, indicated here with reference numeral 174.

Figure 2:
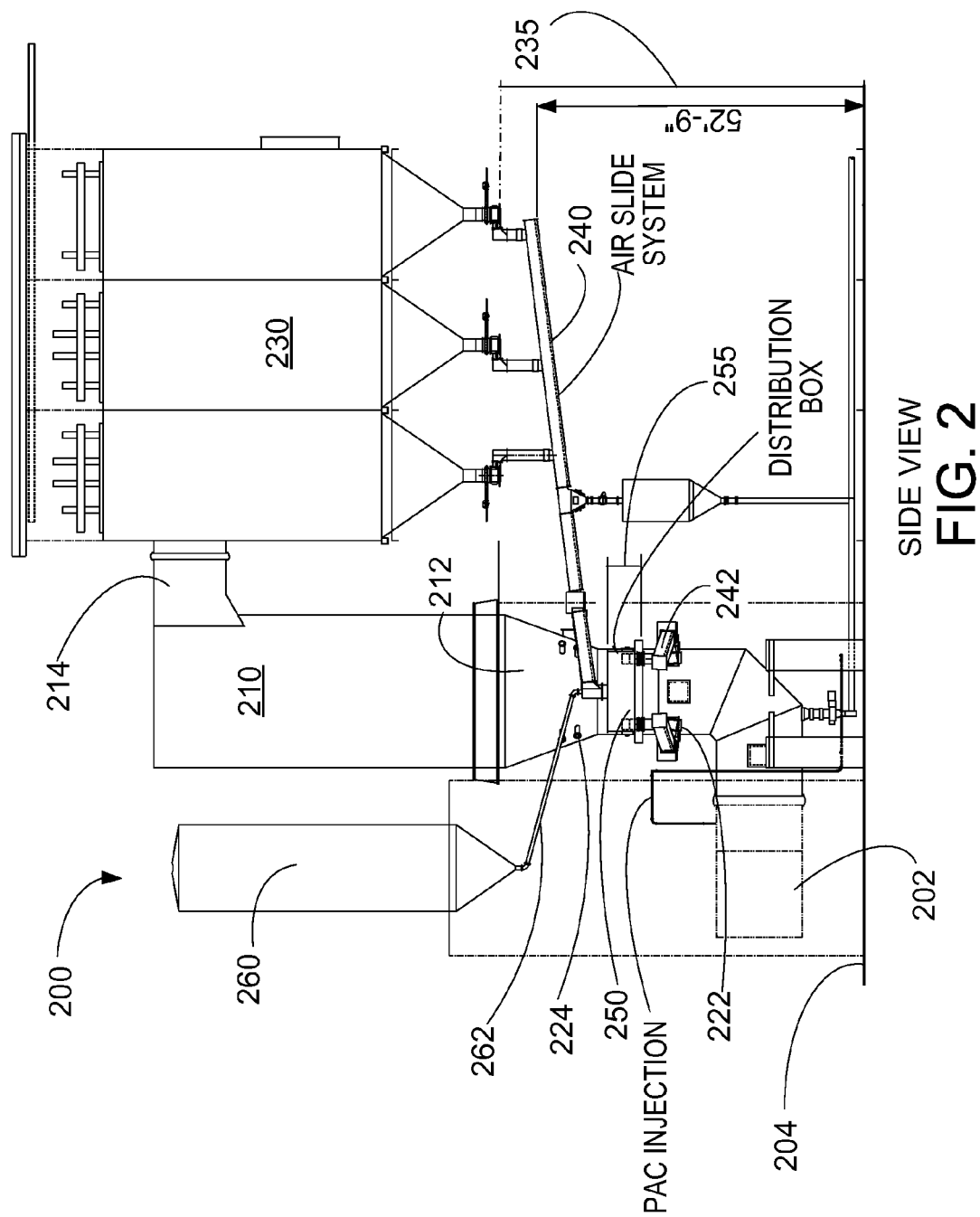
FIG. 2 is a side view of a conventional desulfurization system using a distribution box.
Figure 3:
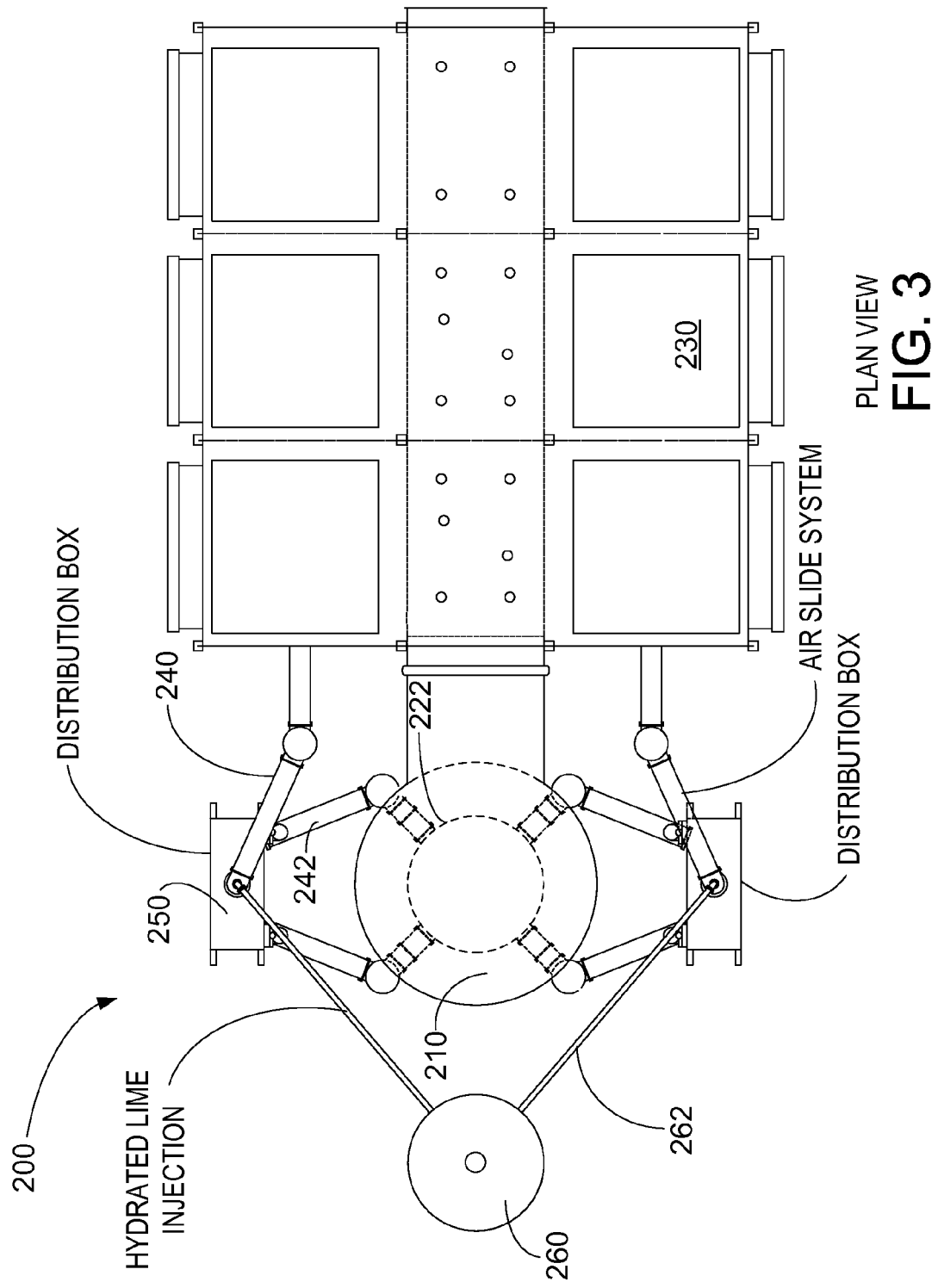
FIG. 3 is a plan (top) view of the conventional system of FIG. 2.
Figure 4:
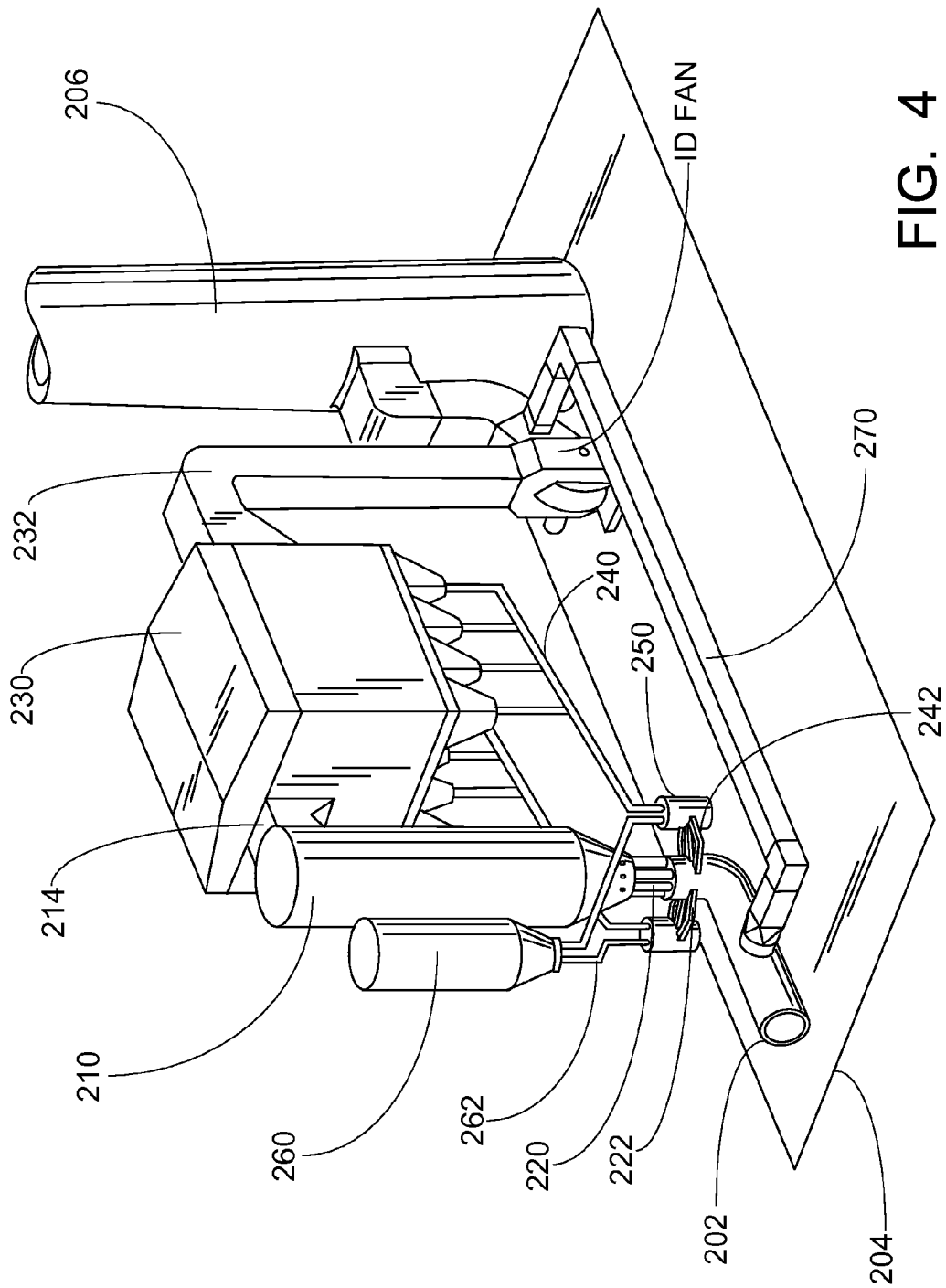
FIG. 4 is a perspective view of the conventional system of FIG. 2.

FIG. 2 and FIG. 3 provide some additional detail on a conventional recycle system 200 used to return solid particles back to the absorber vessel. FIG. 2 is a side view, and FIG. 3 is a plan view (i.e. from the top). FIG. 4 is a perspective view of a similar recycle system.

Referring initially to FIG. 2, untreated flue gas enters the pollution control system from the left side through channel 202, which is at a low elevation relative to grade 204. The channel then turns vertically so that the flue gas flows upwards through Venturis 220 (see FIG. 4) into a bottom inlet 212 of the circulating dry scrubber (CDS) absorber vessel 210. As the flue gas flows upwards, the flue gas passes through solids injection points 222 which are upstream of the Venturis 220. This illustration, as seen in FIG. 3, shows four Venturis. Water injection points 224 are located at the base of the absorber vessel 210 and downstream of the Venturis 220. Solid particles and cleaned gas then flow from a top outlet 214 of the absorber vessel into the baghouse 230. The baghouse 230 is elevated a certain height 235 above grade 204.

Next, the solid particles are removed from the gas stream, and some of the solid particles are recirculated back from the baghouse to the absorber vessel. The solid particles exit the baghouse 230 through hoppers onto an air slide 240. One or two air slides can be used, depending on the size and the arrangement of the baghouse. The solid particles then need to be split approximately evenly onto a second set of air slides equal to the number of solids injection points.

This can be done using a distribution box 250. The air slides 240 lead from the baghouse 230 to the distribution box 250. Here, two distribution boxes are shown. The distribution box divides the solid particle flow from the baghouse into two different streams, which then travel down another air slide 242 to a solids injection point 222. In FIG. 3 there are four solids injection points, while in FIG. 4, there are six solids injection points, one for each Venturi 220, evenly spaced around the absorber vessel 210. Each air slide has a minimum slope of seven (7) degrees to achieve flow. The distribution box 250 generally has a height 255 of about 8 feet to about 15 feet. It should be noted that as seen in FIG. 3, the distribution boxes are located to the sides of the absorber vessel, not underneath the absorber vessel, i.e. the distribution box does not affect the height of the absorber vessel.

A hydrated lime silo 260 has a channel 262 leading from the hydrated lime silo to each distribution box 250. As seen in FIG. 4, fresh hydrated lime is injected into the distribution box 250, or alternatively into the top of the CDS absorber vessel 210 (not shown). The distribution box also mixes the solid particles with the fresh hydrated lime. Generally, the fresh hydrated lime silo 260 is elevated above the injection point so that at least a 15° slope can be achieved from the silo to the injection point, permitting fresh hydrated lime to be fed by gravity.

Referring still to FIG. 4, the clean gas exits the baghouse 230 through duct 232 to a stack 206 downstream of the baghouse, from which the clean gas can be vented to atmosphere. A clean gas recirculation flue 270 is also seen, which recycles clean flue gas from downstream of the baghouse 230 to a point upstream of the solids injection point 222.

Figure 5:
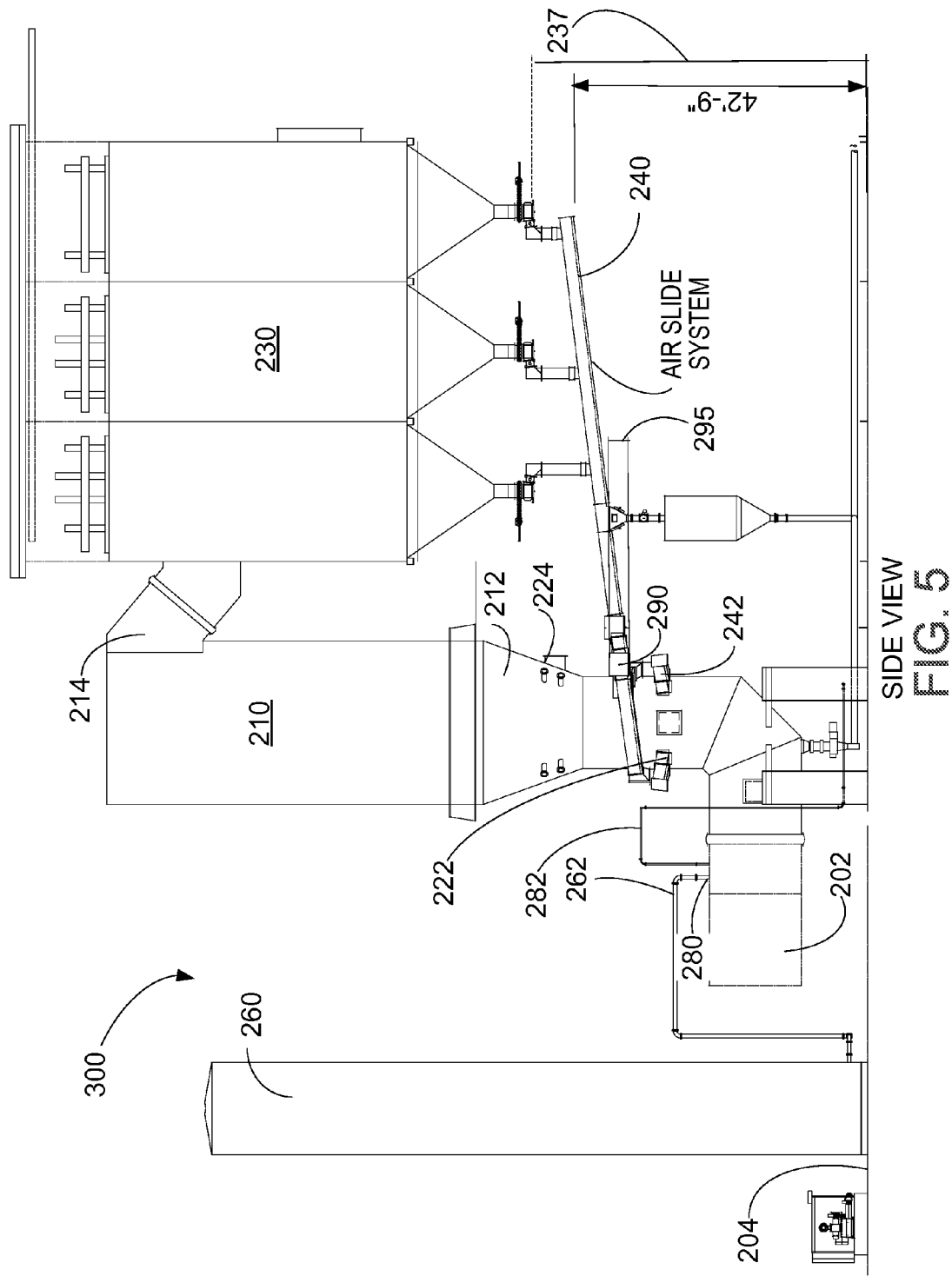
FIG. 5 is a side view of the desulfurization system of the present disclosure.
Figure 6:
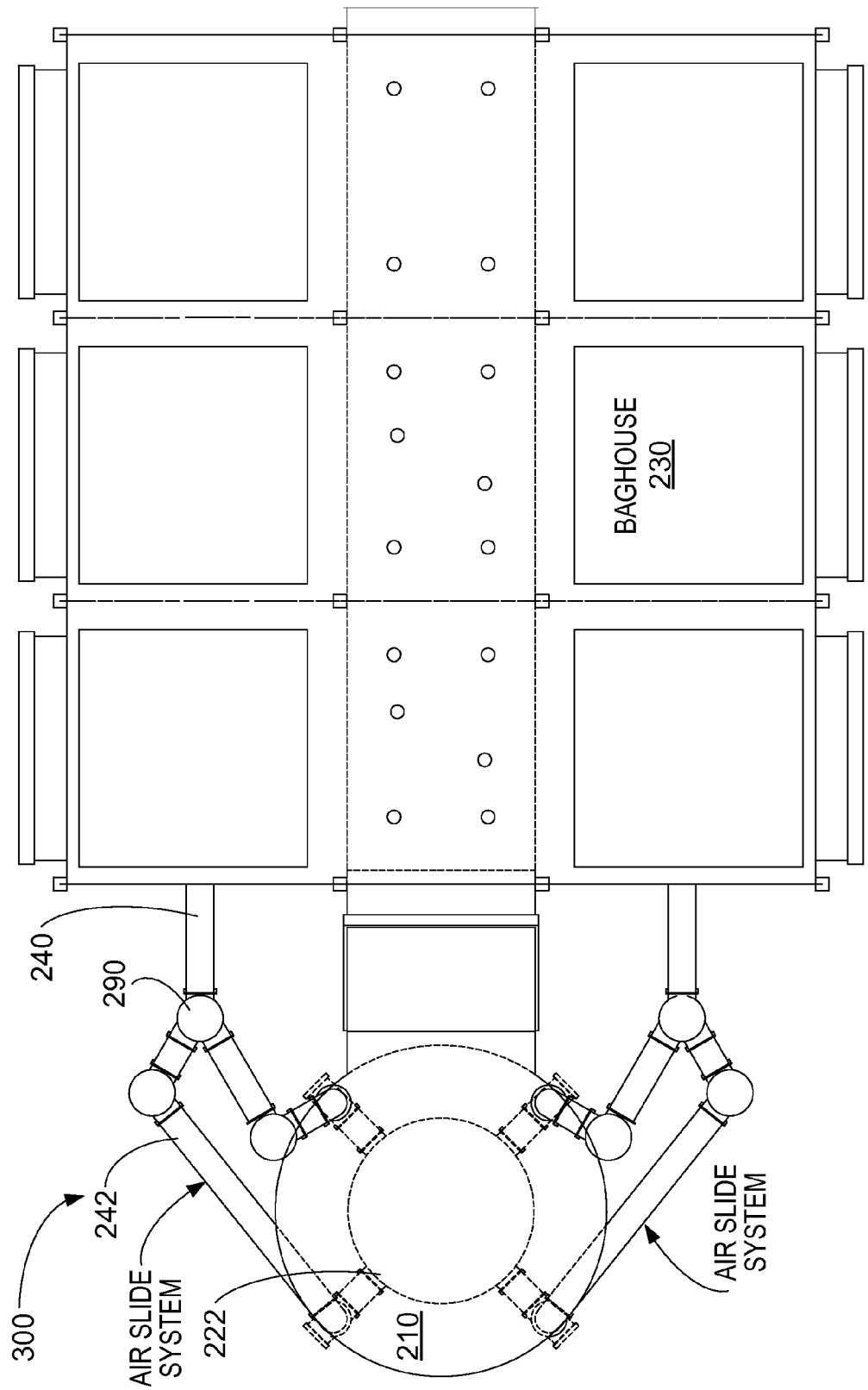
FIG. 6 is a plan view of the desulfurization system of FIG. 5.

FIG. 5 and FIG. 6 provide some additional detail on the recycle system 300 of the present disclosure, which is used to return solid particles back to the absorber vessel. FIG. 5 is a side view, and FIG. 6 is a plan view (i.e. from the top).

Several components of the present recycle system 300 are similar to that described in FIG. 2 and FIG. 3. The CDS absorber vessel 210 includes a bottom inlet 212 and a top outlet 214, the top outlet connecting to the baghouse 230. A number of Venturis (not shown) feed into the bottom inlet, the number being dependent upon the specific application. There is a solids injection point 222 for each Venturi, located below (upstream) the Venturi. At least one water injection point 224 is located above (downstream) each Venturi. It should be noted that the solids injection points are generally in the same horizontal plane. Similarly, the Venturis are generally in the same horizontal plane, and the water injection points are generally in the same horizontal plane.

Some differences are noteworthy. Initially, the hydrated lime silo 260 is located at grade 204 and is not elevated to the same extent as in FIG. 4. Rather than a gravity feed, the fresh hydrated lime is injected. Second, instead of the hydrated lime being fed into the distribution box, the hydrated lime injection point 280 is moved to be directly injected into the flue gas channel 202 at a location that is upstream of the CDS absorber vessel 210 and is not in the recycle stream (i.e. any of the air slides). The hydrated lime channel 262 feeds the new hydrated lime injection point 280, which is located upstream of the solids injection points 222. A powdered activated carbon (PAC) injection point 282 is also present in the flue gas channel at a location between the hydrated lime injection point 280 and the solids injection points 222. Placing the hydrated lime injection point upstream of the PAC injection point saves on PAC operating costs. In this regard, PAC is injected to capture mercury, but $SO_3$ deactivates PAC. By injecting the hydrated lime upstream of the PAC injection, $SO_3$ can react with the hydrated lime and be removed, thus being unable to deactivate the PAC.

Figure 7:
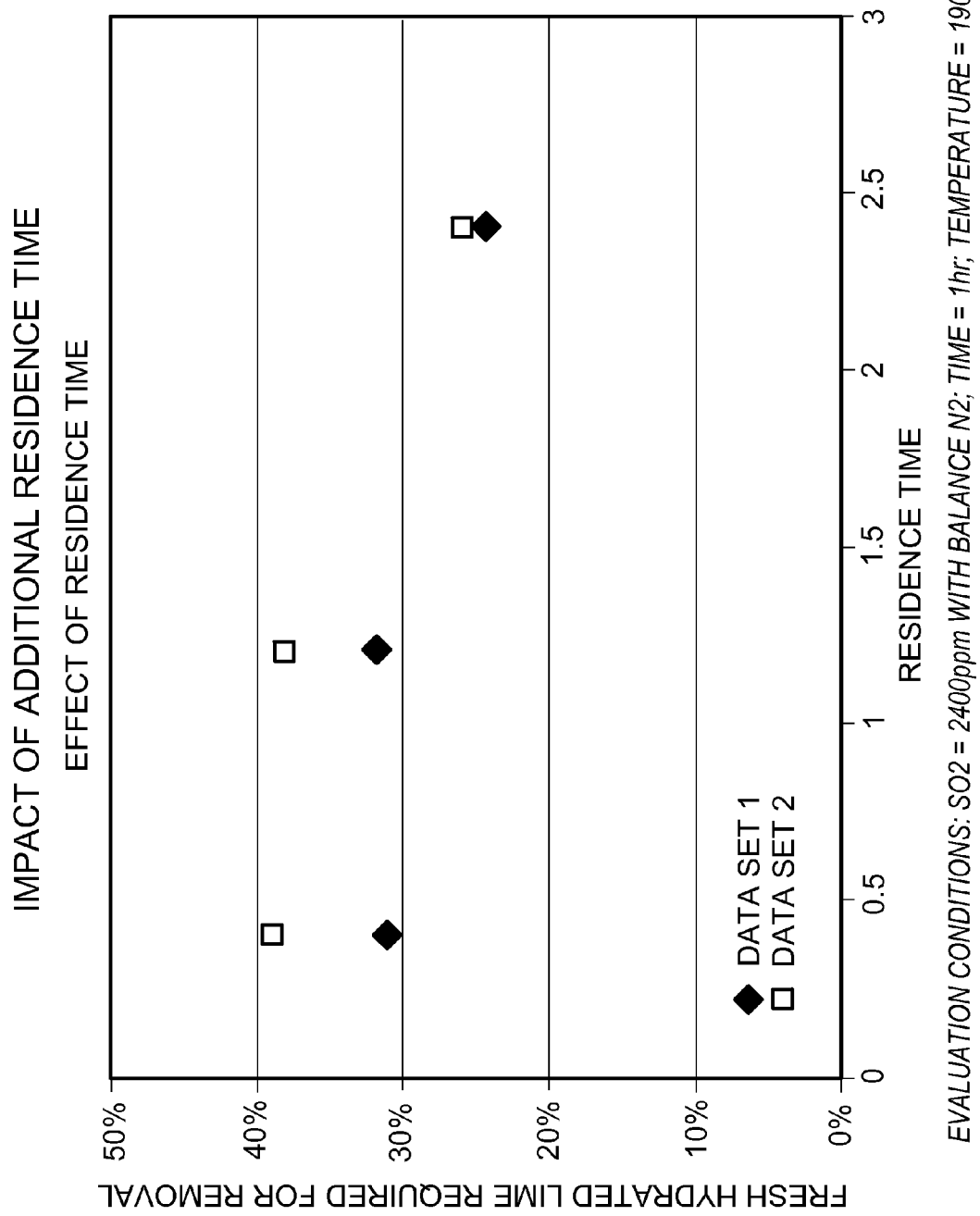
FIG. 7 is a graph showing the effect of additional residence time.

In addition, hydrated lime injection upstream increases the total residence time of the hydrated lime in the system. This allows the hydrated lime to also remove other emissions such as HCl, HF, etc. upstream of the CDS absorber vessel before water is injected into the flue gas, so that the environment in the absorber vessel is less corrosive. FIG. 7 is a graph showing the impact of additional residence time. As the residence time increases, the fresh hydrated lime required for removal decreases. Data Set 2 had more water added to the flue gas compared to Data Set 1. In embodiments, the hydrated lime has a total residence time of about 2.5 seconds to about eight (8) seconds between the hydrated lime injection point and the baghouse.

Next, there is no distribution box. Rather, a first air slide 240 leads from the baghouse 230 directly to a splitter 290. The splitter receives solid particles from the first air slide 240 and separates them to feed at least two second air slides 242, each of which lead directly to a solids injection point 222. Alternatively, the splitter could be considered a part of the air slide(s). Thus, the distribution box can be completely removed. The splitter 290 generally has a height 295 of about 2 feet. The splitter depicted here is a two-way splitter, and three-way or four-way splitters are also contemplated.

Because the height of the distribution box is now removed, the baghouse 230 and the air slides 240, 242 do not need to be elevated to the same extent. The height 237 in FIG. 5 is less than height 235 shown in FIG. 2. These components can now be lowered by several feet in height, saving on the structural steel and the costs associated therewith.

The baghouse may in various embodiments be an electrostatic precipitator (ESP), a reverse gas fabric filter, a shake deflate fabric filter, or a pulse jet fabric filter. Desirably, the baghouse is either a pulse jet fabric filter (PJFF) or a reverse gas fabric filter. In this regard, a baghouse is preferable to an ESP due to the desulfurization ability of the fabric filter compared to an ESP. In other words, the fabric filter can capture pollutants that are in the vapor phase due to buildup of a filter cake, whereas an ESP only traps particles and does not significantly capture vapor-phase pollutants.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flue gas desulfurization system, comprising:
a hydrated lime injection point upstream of a circulating dry scrubber absorber vessel;
a plurality of solids injection points located between the hydrated lime injection point and the circulating dry scrubber absorber vessel;
a baghouse downstream of the circulating dry scrubber absorber vessel, the baghouse separating solid particles from clean gas; and
a recycle system including a first air slide for the solid particles leading from the baghouse directly to a splitter, the splitter separating the solid particles to feed at least two second air slides, each second air slide feeding the solid particles directly to a solids injection point.

2. The system of claim 1, further comprising a Venturi downstream of each solids injection point, each Venturi feeding into a bottom inlet of the circulating dry scrubber absorber vessel.

3. The system of claim 1, further comprising a hydrated lime silo feeding the hydrated lime injection point.

4. The system of claim 1, further comprising a powdered activated carbon injection point between the hydrated lime injection point and the plurality of solids injection points.

5. The system of claim 1, wherein the baghouse is a pulse jet fabric filter, a shake deflate fabric filter, a reverse gas fabric filter, or an electrostatic precipitator.

6. The system of claim 1, wherein the circulating dry scrubber absorber vessel includes a bottom inlet and a top outlet.

7. The system of claim 1, wherein the circulating dry scrubber absorber vessel includes water injection points above the solids injection points.

8. The system of claim 1, wherein no distribution box is present in the recycle system between the baghouse and the solids injection points.

9. The system of claim 1, further comprising a clean gas recirculation flue leading from downstream of the baghouse to a point upstream of the solids injection points.

10. The system of claim 1, wherein hydrated lime has a residence time of about 2.5 seconds to about 8 seconds between the hydrated lime injection point and the baghouse.

11. A method for recycling solid particles in a flue gas desulfurization system, comprising:
separating solid particles from clean gas in a baghouse;
sending at least a portion of the solid particles down a first air slide directly to a splitter, the splitter separating the solid particles to feed at least two second air slides, each second air slide feeding the solid particles directly to a solids injection point upstream of a circulating dry scrubber absorber vessel;
reinjecting the solid particles into a flue gas flowpath at the solids injection points; and
adding new hydrated lime into the flue gas flowpath at a hydrated lime injection point upstream of the solids injection points.

12. The method of claim 11, wherein the reinjected solid particles pass through a Venturi downstream of each solids injection point, each Venturi feeding into a bottom inlet of the circulating dry scrubber absorber vessel.

13. The method of claim 11, wherein a hydrated lime silo feeds the hydrated lime injection point.

14. The method of claim 11, further comprising injecting powdered activated carbon at an injection point located between the hydrated lime injection point and the at least two solids injection points.

15. The method of claim 11, wherein the baghouse is a pulse jet fabric filter, a shake deflate fabric filter, a reverse gas fabric filter, or an electrostatic precipitator.

16. The method of claim 11, wherein the circulating dry scrubber absorber vessel includes a bottom inlet and a top outlet.

17. The method of claim 11, wherein the circulating dry scrubber absorber vessel includes water injection points above the solids injection points.

18. The method of claim 11, wherein no distribution box is present in the recycle system between the baghouse and the solids injection points.

19. The method of claim 11, further comprising recirculating at least a portion of the clean gas from downstream of the baghouse to a point upstream of the solids injection points.

20. The method of claim 11, wherein hydrated lime has a residence time of about 2.5 seconds to about 8 seconds between the hydrated lime injection point and the baghouse.

\* \* \* \* \*